(12) United States Patent
Nicholson et al.

(10) Patent No.: US 11,809,770 B1
(45) Date of Patent: Nov. 7, 2023

(54) LOGIC DISPLAY LOCATION BASED ON PHYSICAL CONNECTOR LOCATION

(71) Applicant: LENOVO (SINGAPORE) PTE. LTD., Singapore (SG)

(72) Inventors: John Weldon Nicholson, Cary, NC (US); Daryl C Cromer, Raleigh, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/813,269

(22) Filed: Jul. 18, 2022

(51) Int. Cl.
*G06F 3/14* (2006.01)
*G06F 1/16* (2006.01)

(52) U.S. Cl.
CPC .......... *G06F 3/1423* (2013.01); *G06F 1/1632* (2013.01)

(58) Field of Classification Search
CPC .............................. G06F 3/1423; G06F 1/1632
See application file for complete search history.

(56) References Cited

U.S. PATENT DOCUMENTS

2021/0096730 A1\* 4/2021 Greenebaum ....... G06F 3/04842

\* cited by examiner

*Primary Examiner* — Yaron Cohen
(74) *Attorney, Agent, or Firm* — Schwegman Lundberg & Woessner, P.A.

(57) ABSTRACT

A connection of an external display device to a connector port that is coupled to a personal computing device is sensed. A memory location of the personal computing device is checked to determine if a logical location default for the external display device exists. When the logical location default for the external display device does not exist, a logical location of the external display device is linked to a physical location of the connector port that is coupled to the personal computing device.

20 Claims, 5 Drawing Sheets

LOGIC DISPLAY LOCATION BASED ON PHYSICAL CONNECTOR LOCATION

TECHNICAL FIELD

Embodiments described herein generally relate to basing the logic display location of an external display unit that is connected to a personal computing unit on the physical location of the connector to which the external display unit is connected.

BACKGROUND

When a user adds an external display to a computer for the first time, and the user changes to extended desktop mode, an operating system such as Microsoft's Windows® defaults the logical position of the newly added secondary external display to a particular side of the primary display, such as for example, the right or left side of the primary display. This requires the user to go into the display setting and change the position of the newly added secondary external display if the display is not physically in the default position.

More specifically, in the Windows® environment, the user profile is a record of personal, user-specific data that are associated with a named user's identity and desktop environment. It contains many elements, such as settings, configuration items, connections, and history. Part of the Windows® user profile is the external display cache stored in the registry file. The external display cache stores display mode, resolution, logical location, and other settings for each display connected to the user's personal computer. When the user connects an external display, Windows® checks to see if the display identification is stored in the external display cache. If it is, Windows® applies the stored settings. If it is not, Windows® creates a new entry with the default setting including the logical location default.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1A:
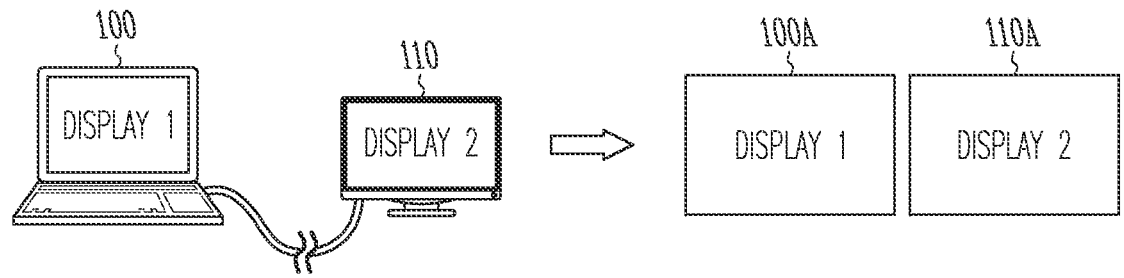
FIGS. 1A and 1B illustrate the logic relationship of an external display that is connected to a first side and a second side of a personal computer.
Figure 1B:
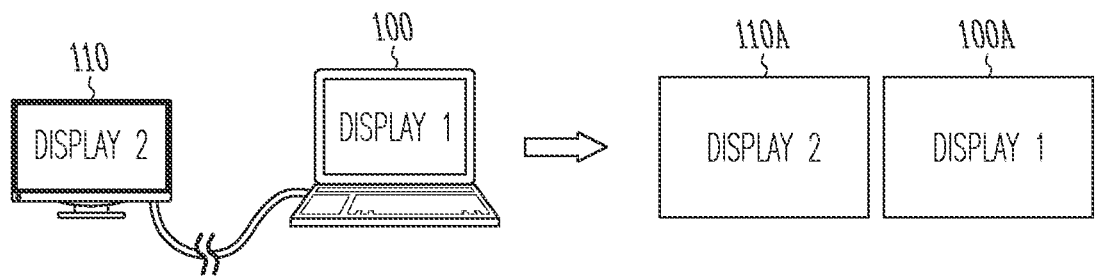

An embodiment of the present disclosure links the logical default position (when the display is not found in the user profile) with the physical location of the connector used. In an embodiment, if the user uses a connector on the left side of the device, the display is logically located on the left side. If the user uses a connector on the right side, then the display is logically located on the right side. Referring to FIG. 1A, the external display 110 is connected to the right side of the computing unit 100, so the logical position 110A of the external display is to the right of the logical position 100A of the computing device 100. Similarly, FIG. 1B illustrates the external display 110 is connected to the left side of the computing unit 100, so the logical position 110A of the external display is to the left of the logical position 100A of the computing device 100. Consequently, in FIG. 1A, when a user moves his or her cursor to the right, the cursor also moves to the right and moves from the display of computing unit 100 to the display of computing unit 110. Similarly, in FIG. 1B, when a user moves his or her cursor to the left, the cursor also moves to the left from the display of the computing unit 100 to the display of the external device 110.

Figure 2:
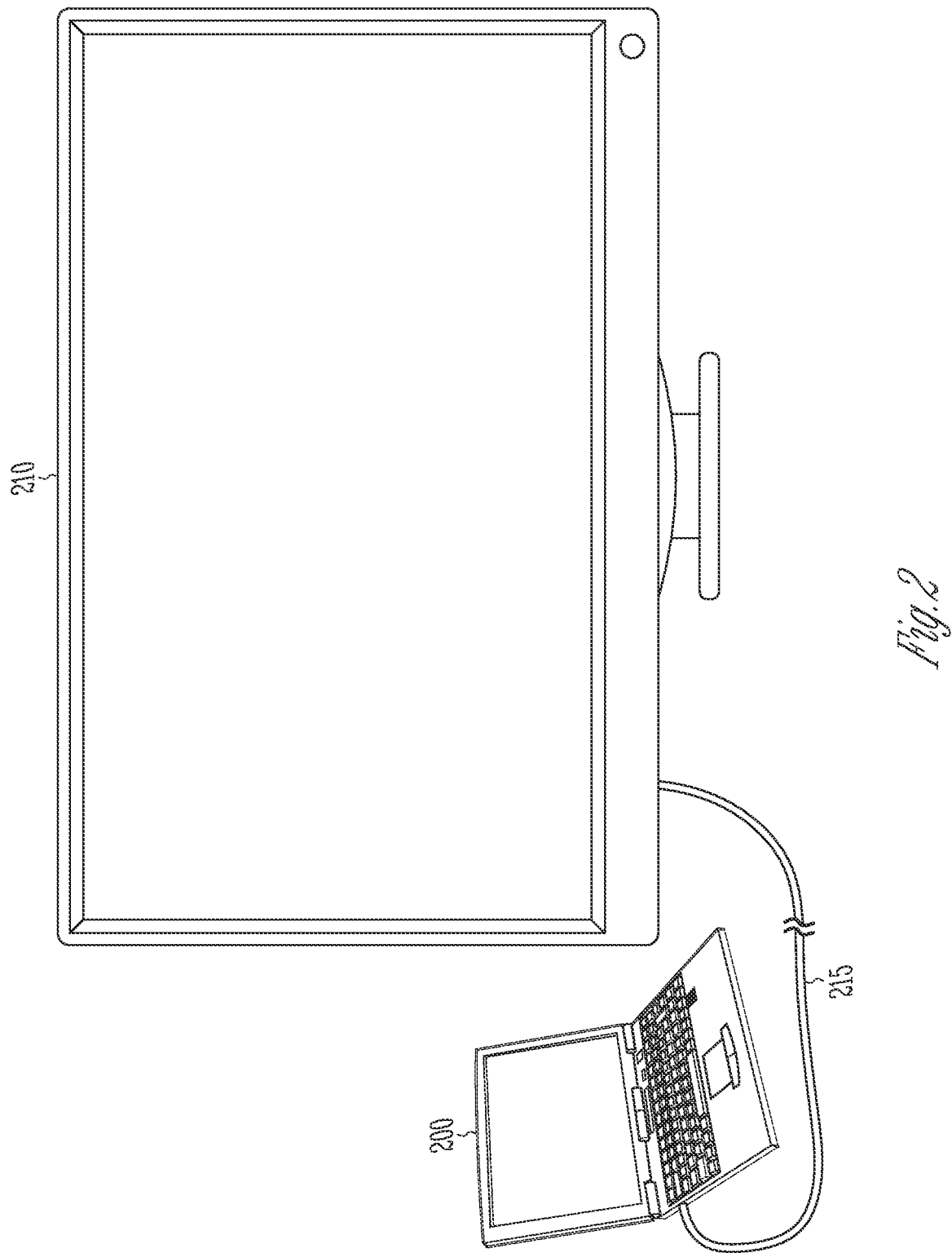
FIG. 2 illustrates another logic relationship of an external display that is connected to a personal computer.

It is noted that this logical relationship need not be strictly right-to-right and/or left-to-left. The preferred arrangement could be a left-side connector to right-side local display position. For example, this may be preferred so that the displays can be placed more closely together, which a cable may otherwise prevent. This is illustrated in FIG. 2, wherein if the external display device 210 is placed to the left of the laptop 200, the cable 215 would prevent the external display device 210 from being placed close to the laptop 200.

Additionally, embodiments of the present disclosure are not limited to right side and left side orientations. Additional arrangements could include ones that are above and below the computing units 100 and 200, and in front of and behind the computing units 100 and 200. Therefore, in this disclosure, the use of the term "side" is not limited to either a left side or a right side.

Figure 3A:
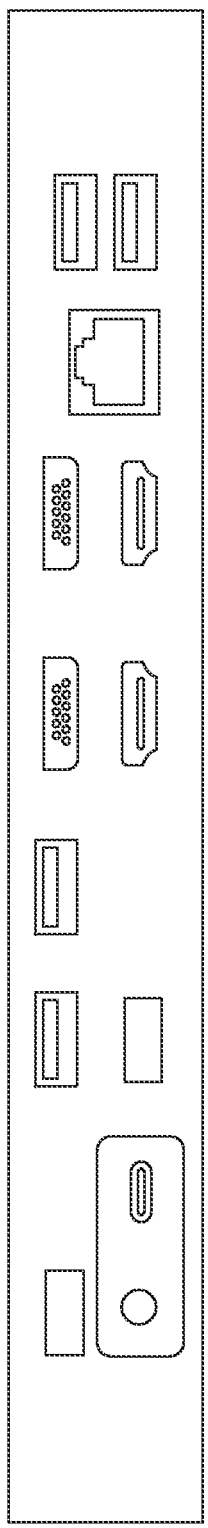
FIGS. 3A and 3B illustrate panels of computing devices that include a plurality of connectors.
Figure 3B:
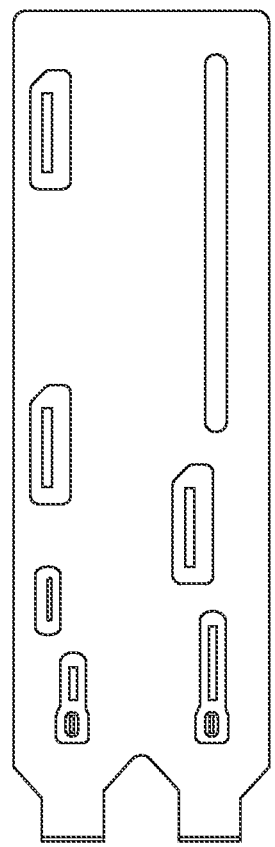

This solution can extend beyond laptops to port replicators or docking stations 300A as illustrated in FIG. 3A as well as desktop graphics adapters 300B as illustrated in FIG. 3B. FIGS. 3A and 3B illustrate that in some cases, especially on docking stations or desktop adapters, the arrangement of ports may include a vertical arrangement, or even be primarily vertical. In cases such as these, there might be a direct vertical mapping between ports (a first port above a second port will be logically located above the second port), or there might be a rotated mapping (a top port above a second port will be logically located to the right of a bottom port, or vice versa).

In another embodiment, a device such as a port replicator may include multiple connectors that are exclusive (i.e., only one port can be used at a time), and the default logical location is determined only by which port is the one that is currently connected. For example, the use of a display (DP) port could imply a logical left position, and the use of an HDMI port could imply a logical right position.

It is noted that USB Type-C connectors are relatively small and can support external displays. The connector also supports any type of external USB device. Because of the flexibility and small size, many notebooks have multiple USB Type-C connectors on different locations or sides of the device, and the connector type is quickly becoming the default or standard interface. Embodiments of this disclosure can also be applied to these types of USB connectors. Indeed, embodiments can be applied to virtually any connector type, either now known or later developed, since the embodiments simply associate the physical location of a display connection with the logical display position.

Figure 4A:
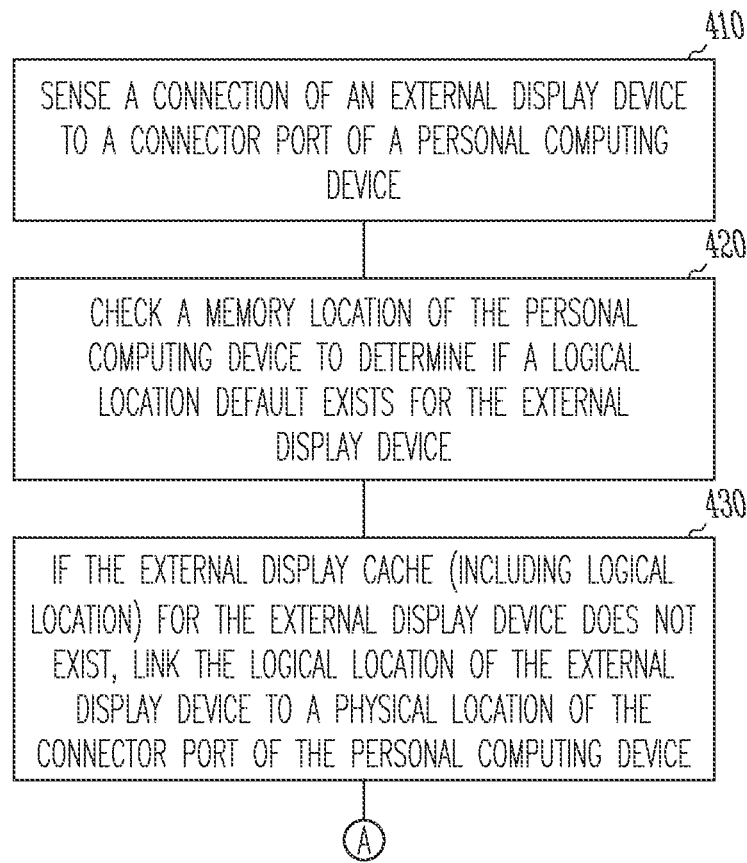
FIGS. 4A and 4B are a block diagram illustrating operations and features of a system that bases the logic display location of an external display unit that is connected to a personal computing unit on the physical location of the connector to which the external display unit is connected.
Figure 4B:
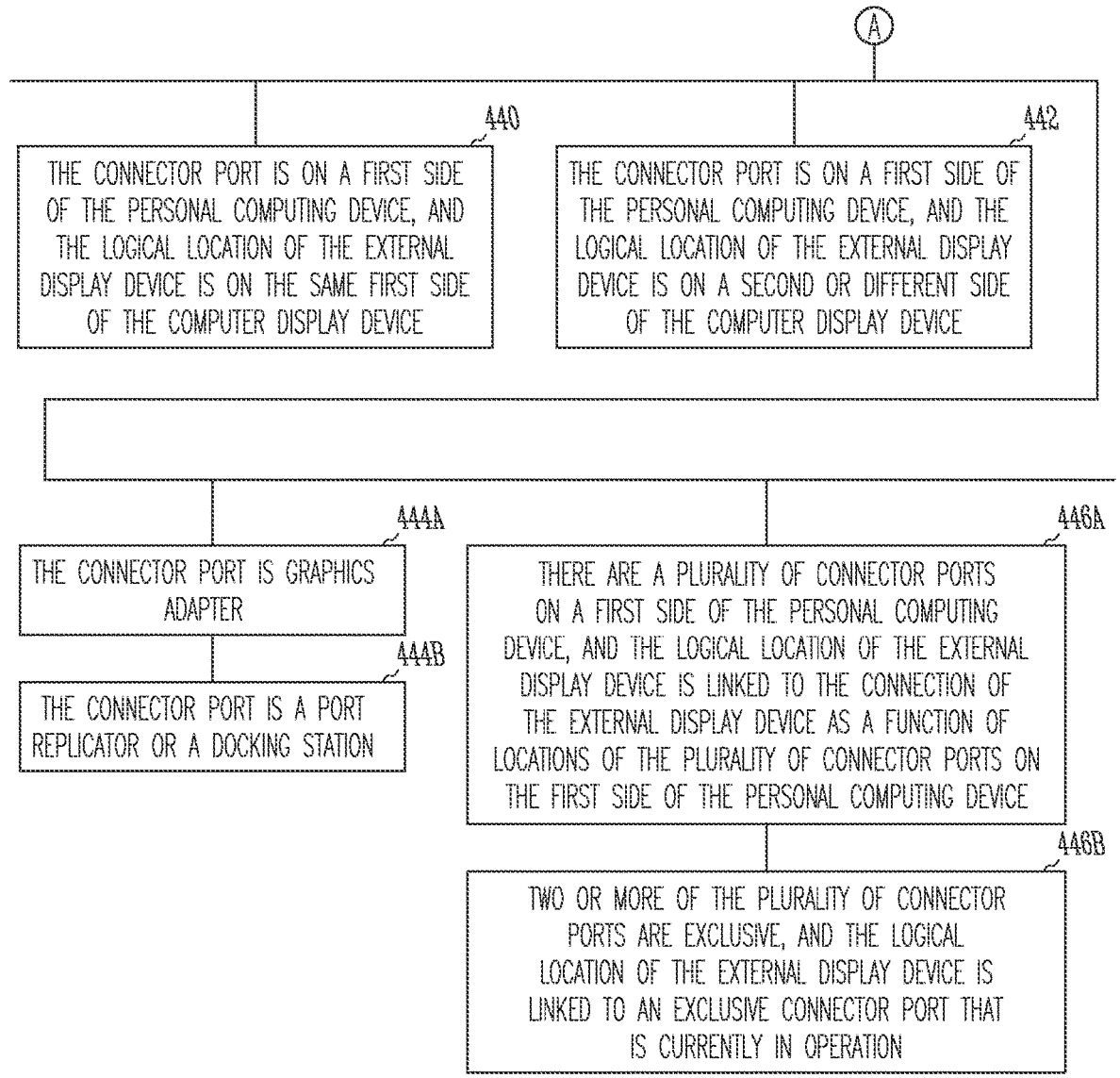

FIGS. 4A and 4B are a block diagram illustrating operations and features of a system that bases the logical display location of an external display unit that is connected to a personal computing unit on the physical location of the connector to which the external display unit is connected. FIGS. 4A and 4B include a number of feature and process blocks 410-446B. Though arranged substantially serially in the example of FIGS. 4A and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Now, referring specifically to FIGS. 4A and 4B, at 410, a connection of an external display device to a connector port that is associated with a personal computing device is sensed. At 420, a memory location (e.g., a cache) of the personal computing device is checked to determine if a physical location default for the external display device exists. At 430, if the external display cache (including logical location) for the external display device does not exist, link the logical location of the external display device to a physical location of the connector port of the personal computing device.

As indicated at 440, in an embodiment, the connector port is connected to a first side of the personal computing device, and the logical location of the external display device is located on the same first side of the computer display device. This arrangement can be considered the typical left side and right side of the personal computing unit. However, as noted above, the use of the term "side" is not limited to a left side and a ride of a personal computing device, but also includes such arrangements as above and below the personal computing device, and in front of and behind the personal computing device.

As indicated at 442, in another embodiment, the connector port is connected to a first side of the personal computing device, and the logical location of the external display device is located on a second or different side of the computer display device.

As indicated at 444A, the connector port can be a graphics adapter, and as indicated at 444B, the connector port can be a port replicator or a docking station.

In an embodiment, there can be a plurality of connector ports that are located on a single side of the personal computing device. In this embodiment, the logical location of the external display device is linked to the connection of the external display device as a function of the locations of the plurality of connector ports that are located on the single side of the personal computing device (446A). For example, a connector port that is located above another connector port can be logically linked to the right side of the personal computing device, while the connector port located below that port can be logically linked to the left side of the personal computing device. Also, as indicated at 446B, two or more of the plurality of connector ports that are on a single side of the personal computing device can be exclusive, and the logical location of the external display device is linked to an exclusive connector port that is currently in operation. Referring to the just-discussed example, a connector port that is currently in exclusive operation mode can be logically linked to the right side of the personal computing device, while a different connector port, when it is in exclusive operation mode, can be logically linked to the left side of the personal computing device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

Examples

Example No. 1 is a process including sensing a connection of an external display device to a connector port operatively coupled to a personal computing device; checking a memory location of the personal computing device to determine if a logical location default for the external display device exists; and when the logical location default for the external display device does not exist, linking a logical location of the external display device to a physical location of the connector port operatively coupled to the personal computing device.

Example No. 2 includes all the features of Example No. 1, and optionally includes a process wherein the connector port is operatively coupled to a first side of the personal computing device, and the logical location of the external display device is on the same first side of the computer display device.

Example No. 3 includes all the features of Example Nos. 1-2, and optionally includes a process wherein the connector port is operatively coupled to a first side of the personal computing device, and the logical location of the external display device is on a second side of the computer display device.

Example No. 4 includes all the features of Example Nos. 1-3, and optionally includes a process wherein the connector port comprises a graphics adapter.

Example No. 5 includes all the features of Example Nos. 1-4, and optionally includes a process wherein the connector port comprises a port replicator or a docking station.

Example No. 6 includes all the features of Example Nos. 1-5, and optionally includes a process wherein there are a plurality of connector ports operatively coupled to a first side of the personal computing device, and including linking the logical location of the external display device to the connection of the external display device as a function of locations of the plurality of connector ports operatively coupled to the first side of the personal computing device.

Example No. 7 includes all the features of Example Nos. 1-6, and optionally includes a process wherein some of the plurality of connector ports are exclusive, and comprising linking the logical location of the external display device to an exclusive connector port that is currently in operation.

Example No. 8 is a machine-readable medium including instructions that when executed by a processor execute a process including sensing a connection of an external display device to a connector port operatively coupled to a personal computing device; checking a memory location of the personal computing device to determine if a logical location default for the external display device exists; and when the logical location default for the external display device does not exist, linking a logical location of the external display device to a physical location of the connector port operatively coupled to the personal computing device.

Example No. 9 includes all the features of Example No. 8, and optionally includes a machine-readable medium wherein the connector port is operatively coupled to a first side of the personal computing device, and the logical location of the external display device is on the same first side of the computer display device.

Example No. 10 includes all the features of Example Nos. 8-9, and optionally includes a machine-readable medium wherein the connector port is operatively coupled to a first side of the personal computing device, and the logical location of the external display device is on a second side of the computer display device.

Example No. 11 includes all the features of Example Nos. 8-10, and optionally includes a machine-readable medium wherein the connector port comprises a graphics adapter.

Example No. 12 includes all the features of Example Nos. 8-11, and optionally includes a machine-readable medium wherein the connector port comprises a port replicator or a docking station.

Example No. 13 includes all the features of Example Nos. 8-12, and optionally includes a machine-readable medium wherein there are a plurality of connector ports operatively coupled to a first side of the personal computing device, and comprising linking the logical location of the external display device to the connection of the external display device as a function of locations of the plurality of connector ports operatively coupled to the first side of the personal computing device.

Example No. 14 includes all the features of Example Nos. 8-13, and optionally includes a machine-readable medium wherein some of the plurality of connector ports are exclusive, and comprising linking the logical location of the external display device to an exclusive connector port that is currently in operation.

Example No. 15 is a system including a computer processor and a memory coupled to the computer processor; wherein the computer processor and the memory are operable for: sensing a connection of an external display device to a connector port operatively coupled to a personal computing device; checking a memory location of the personal computing device to determine if a logical location default for the external display device exists; and when the logical location default for the external display device does not exist, linking a logical location of the external display device to a physical location of the connector port operatively coupled to the personal computing device.

Example No. 16 includes all the features of Example No. 15, and optionally includes a system wherein the connector port is operatively coupled to a first side of the personal computing device, and the logical location of the external display device is on the same first side of the computer display device.

Example No. 17 includes all the features of Example Nos. 15-16, and optionally includes a system wherein the connector port is operatively coupled to a first side of the personal computing device, and the logical location of the external display device is on a second side of the computer display device.

Example No. 18 includes all the features of Example Nos. 15-17, and optionally includes a system wherein the connector port comprises a graphics adapter.

Example No. 19 includes all the features of Example Nos. 15-18, and optionally includes a system wherein the connector port comprises a port replicator or a docking station.

Example No. 20 includes all the features of Example Nos. 15-19, and optionally includes a system wherein there are a plurality of connector ports operatively coupled to a first side of the personal computing device, and comprising linking the logical location of the external display device to the connection of the external display device as a function of locations of the plurality of connector ports operatively coupled to the first side of the personal computing device; and wherein some of the plurality of connector ports are exclusive, and comprising linking the logical location of the external display device to an exclusive connector port that is currently in operation.

The invention claimed is:

1. A process comprising:
sensing a connection of an external display device to a connector port on a personal computing device;
checking a memory location of the personal computing device to determine if a logical location default for the external display device exists; and
when the logical location default for the external display device does not exist, linking a logical location of the external display device to a physical location of the connector port on the personal computing device.

2. The process of claim 1, wherein the connector port is on a first side of the personal computing device, and the logical location of the external display device is on the same first side of the computer display device.

3. The process of claim 1, wherein the connector port is on a first side of the personal computing device, and the logical location of the external display device is on a second side of the computer display device.

4. The process of claim 1, wherein the connector port comprises a graphics adapter.

5. The process of claim 1, wherein the connector port comprises a port replicator or a docking station.

6. The process of claim 1, wherein there are a plurality of connector ports on a first side of the personal computing device, and comprising linking the logical location of the external display device to the connection of the external display device as a function of locations of the plurality of connector ports on the first side of the personal computing device.

7. The process of claim 6, wherein two or more of the plurality of connector ports are exclusive, and comprising linking the logical location of the external display device to an exclusive connector port that is currently in operation.

8. A non-transitory machine-readable medium comprising instructions that when executed by a processor execute a process comprising:
   sensing a connection of an external display device to a connector port on a personal computing device;
   checking a memory location of the personal computing device to determine if a logical location default for the external display device exists; and
   when the logical location default for the external display device does not exist, linking a logical location of the external display device to a physical location of the connector port on the personal computing device.

9. The non-transitory machine-readable medium of claim 8, wherein the connector port is on a first side of the personal computing device, and the logical location of the external display device is on the same first side of the computer display device.

10. The non-transitory machine-readable medium of claim 8, wherein the connector port is on a first side of the personal computing device, and the logical location of the external display device is on a second side of the computer display device.

11. The non-transitory machine-readable medium of claim 8, wherein the connector port comprises a graphics adapter.

12. The non-transitory machine-readable medium of claim 8, wherein the connector port comprises a port replicator or a docking station.

13. The non-transitory machine-readable medium of claim 8, wherein there are a plurality of connector ports on a first side of the personal computing device, and comprising linking the logical location of the external display device to the connection of the external display device as a function of locations of the plurality of connector ports on the first side of the personal computing device.

14. The non-transitory machine-readable medium of claim 13, wherein two or more of the plurality of connector ports are exclusive, and comprising linking the logical location of the external display device to an exclusive connector port that is currently in operation.

15. A system comprising:
   a computer processor; and
   a memory coupled to the computer processor;
wherein the computer processor and the memory are operable for:
   sensing a connection of an external display device to a connector port on a personal computing device;
   checking a memory location of the personal computing device to determine if a logical location default for the external display device exists; and
   when the logical location default for the external display device does not exist, linking a logical location of the external display device to a physical location of the connector port on the personal computing device.

16. The system of claim 15, wherein the connector port is on a first side of the personal computing device, and the logical location of the external display device is on the same first side of the computer display device.

17. The system of claim 15, wherein the connector port is on a first side of the personal computing device, and the logical location of the external display device is on a second side of the computer display device.

18. The system of claim 15, wherein the connector port comprises a graphics adapter.

19. The system of claim 15, wherein the connector port comprises a port replicator or a docking station.

20. The system of claim 15, wherein there are a plurality of connector ports on a first side of the personal computing device, and comprising linking the logical location of the external display device to the connection of the external display device as a function of locations of the plurality of connector ports on the first side of the personal computing device; and wherein two or more of the plurality of connector ports are exclusive, and comprising linking the logical location of the external display device to an exclusive connector port that is currently in operation.

* * * * *